(12) United States Patent
Ker et al.

(10) Patent No.: US 8,116,049 B2
(45) Date of Patent: Feb. 14, 2012

(54) TRANSIENT VOLTAGE DETECTION CIRCUIT

(75) Inventors: Ming-Dou Ker, Taipei County (TW); Hsin-Chin Jiang, Taipei County (TW); Wen-Yi Chen, Taipei County (TW)

(73) Assignee: Amazing Microelectronic Corp., Taipei (TW)

(*) Notice: Subject to any disclaimer, the term of this patent is extended or adjusted under 35 U.S.C. 154(b) by 289 days.

(21) Appl. No.: 12/625,449

(22) Filed: Nov. 24, 2009

(65) Prior Publication Data

US 2010/0315754 A1 Dec. 16, 2010

(30) Foreign Application Priority Data

Jun. 11, 2009 (TW) ............................... 98119569 A (51) Int. Cl.
*H02H 3/22* (2006.01)
(52) U.S. Cl. .......................................... 361/56; 361/111
(58) Field of Classification Search .................... 361/56, 361/111
See application file for complete search history.

(56) References Cited

U.S. PATENT DOCUMENTS

| 7,102,862 | B1* | 9/2006 | Lien et al. ........................ 361/56 |
| 2007/0285854 | A1* | 12/2007 | Rodgers et al. ................. 361/56 |
| 2009/0268364 | A1* | 10/2009 | Trautman ....................... 361/111 |

* cited by examiner

*Primary Examiner* — Danny Nguyen
(74) *Attorney, Agent, or Firm* — Morris Manning & Martin LLP; Tim Tingkang Xia, Esq.

(57) ABSTRACT

The invention discloses a transient voltage detection circuit suitable for an electronic system. The electronic system includes a high voltage line and a low voltage line. The transient voltage detection circuit includes at least one detection circuit and a judge module. Each detection circuit includes a P-typed transistor and/or an N-typed transistor, a capacitor and a detection node. The transistor is coupled with the capacitor, and the detection node is located between the transistor and the capacitor. The judge module is coupled to each of the detection nodes. The judge module generates a judgment according to voltage levels of the detection nodes. Accordingly, the transient voltage detection circuit is formed. The electronic system may selectively execute a protective action according to the judgment.

20 Claims, 8 Drawing Sheets

TRANSIENT VOLTAGE DETECTION CIRCUIT

BACKGROUND OF THE INVENTION

1. Field of the Invention

The invention relates to a transient voltage detection circuit and, more particularly, to a voltage detection circuit for system-level transient noise.

2. Description of the Prior Art

With the increasing operating speed and more integrated functions, electronic products are becoming more vulnerable to external noises like electromagnetic interference (EMI), system-leveled electrostatic discharge (ESD), electrical fast transient (EFT) events, etc. Those numerous noise signals may cause undershoot on power-supply or overshoot on ground-line voltages of a system, and even crash down the whole system. To meet the component-level ESD reliability, protection circuits like on-chip ESD protection circuits have been added to the I/O cells and power ($V_{DD}$ and $V_{SS}$) cells of CMOS ICs. Moreover, in order to protect the system against system-leveled ESD events, additional discrete components like transient voltage suppressor (TVS) or varactor have been added to the system. If external noises cause voltage overshoot on the power supply, these additional discrete components can clamp down the overshooting voltage on the power supply line and hence protect the system against noises.

However, if the voltage undershoot is induced on the power-supply line, the system is easily hanged up by the noise due to unexpected voltage levels on nodes of internal circuits. The unexpected voltages on internal circuits can also induce mal-function of the system, which can be a serious safety issue especially when it is part of on-board systems of an automobile.

Figure 1:
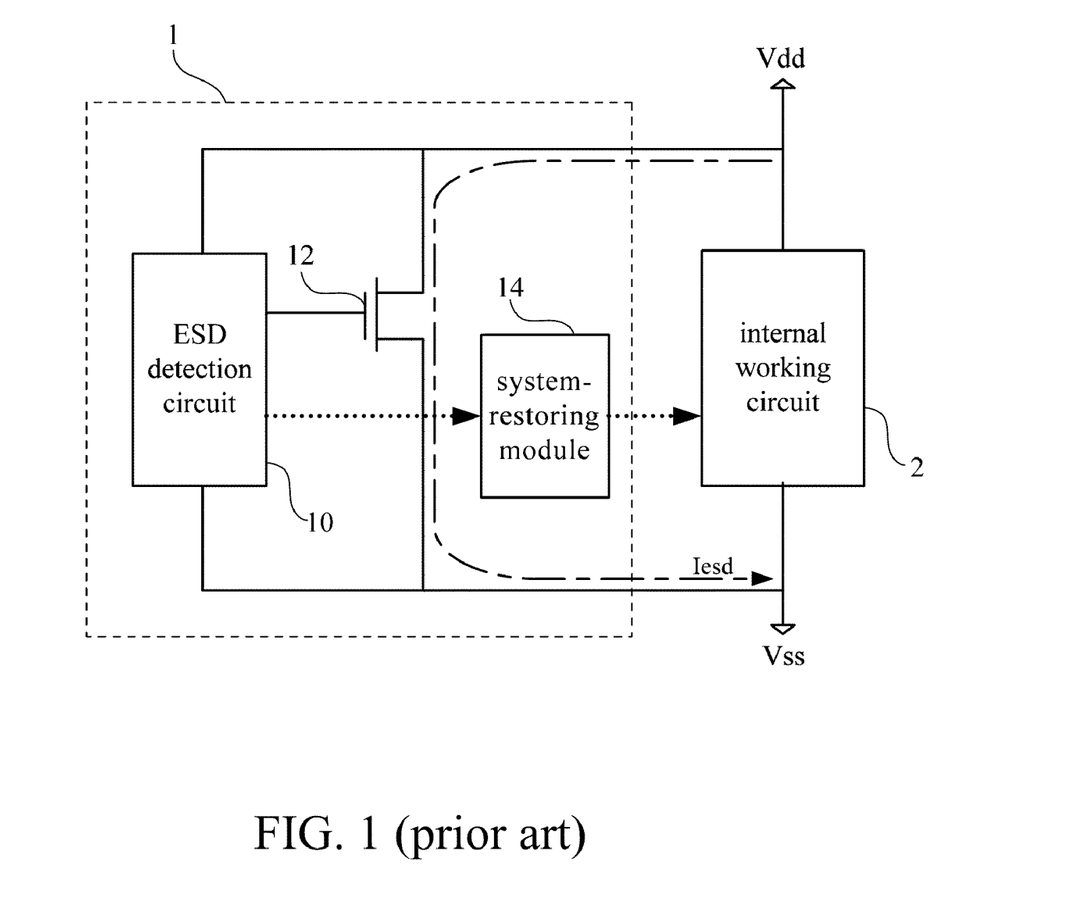
FIG. 1 is a schematic diagram illustrating an ESD protection system in prior art.

In practical applications, the ESD protection system can be implemented within electronic devices for protecting the electronic devices from being damaged by the unexpected ESD current. Please refer to FIG. 1. FIG. 1 is a schematic diagram illustrating an ESD protection system 1 in prior art. As shown in FIG. 1, the ESD protection system 1 includes ESD detection circuit 10, a transistor switch 12 and a system-restoring module 14. The ESD protection system 1 is coupled between a high voltage line Vdd and a low voltage line Vss, for protecting an internal working circuit 2.

Under normal operating condition, the high voltage line Vdd and the low voltage line Vss are utilized to provide a working voltage for driving the internal operating circuit 2, such that the internal working circuit 2 may fulfill its function successfully. In the meantime, the ESD system 1 is disabled.

When an abnormal signal (e.g. a strong transient voltage) occurs between the high voltage line Vdd and the low voltage line Vss because of the ESD phenomenon, the ESD detector 10 may detect the transient voltage and turn on the transistor switch 12. The transistor switch 12 is used for forming a discharging pattern between the high voltage line Vdd and the low voltage line Vss, for conducting the electrostatic discharge current Iesd. In practical applications, traditional ESD detection circuit 10 can be a transient voltage suppressor (TVS) diode or a varactor.

On the other hand, when the transient voltage is detected by the ESD detection circuit 10, the ESD detection circuit 10 may drive the system-restoring module 14, for rebooting or initial-restoring the internal working circuit through system-restoring module 14, so as to recover the internal working circuit 2.

Based on aforesaid examples, we may discover that the electronic system needs a stable and effective detection circuit, which must be able to detect and response to the system-leveled transient voltage (e.g. EMI, ESD and EFT) quickly, in order to trigger the electronic system to perform the following protective action. The invention discloses a transient voltage detection circuit, which can detect various types of system-leveled transient voltage, so as to solve aforesaid problems.

SUMMARY OF THE INVENTION

A scope of the invention is to provide a transient voltage detection circuit suitable for an electronic system. The electronic system includes a high voltage line and a low voltage line.

According to an embodiment, the transient voltage detection circuit includes at least on capacitor coupled between the low voltage line and the drain electrode e detection circuit and a judge module. Each detection circuit includes a P-type metal-oxide-semiconductor field-effect transistor (PMOS), a capacitor and a detection node. The PMOS includes a source electrode, a drain electrode and a bulk electrode. The source electrode is coupled with the bulk electrode, and the source electrode is also coupled to the high voltage line. A parasitic diode is formed between the drain electrode and the bulk electrode of the PMOS. The capacitor is coupled between the low voltage line and the drain electrode. The detection node is coupled between the drain electrode and the capacitor. When a transient voltage occurs on the high voltage line, the PMOS is in an off-state, and in the mean time the capacitor discharges through the parasitic diode to the high voltage line, such that a voltage level of the detection node is lowered.

The judge module is coupled to the detection node of each detection circuit respectively. The judge module judges the voltage level of each detection node and generates a judgment. The electronic system selectively performs a protective action according to the judgment.

According to another embodiment, the transient voltage detection circuit includes at least one detection circuit and a judge module. Each detection circuit includes an N-type metal-oxide-semiconductor field-effect transistor (NMOS), a capacitor and a detection node. The NMOS includes a source electrode, a drain electrode and a bulk electrode. The source electrode is coupled with the bulk electrode, and the source electrode is also coupled to the low voltage line. A parasitic diode is formed between the drain electrode and the bulk electrode of the NMOS. The capacitor is coupled between the high voltage line and the drain electrode. The detection node is coupled between the drain electrode and the capacitor. When a transient voltage occurs on the low voltage line, the NMOS is in an off-state and the capacitor is charged by the low voltage line through the parasitic diode, such that a voltage level of the detection node is elevated.

The judge module is coupled to the detection node of each detection circuit respectively. The judge module judges the voltage level of each detection node and generates a judgment. The electronic system selectively performs a protective action according to the judgment.

According to another embodiment, the transient voltage detection circuit includes at least one detection circuit and a judge module. Each detection circuit includes a PMOS, a NMOS, a capacitor, a first detection node and a second detection node. The PMOS includes a first source electrode, a first drain electrode and a first bulk electrode. The first source electrode is coupled with the first bulk electrode, and the first source electrode is also coupled to the high voltage line. A first parasitic diode is formed between the first drain electrode and the first bulk electrode of the PMOS. The NMOS includes a second source electrode, a second drain electrode and a second bulk electrode. The second source electrode is coupled with the bulk electrode, and the second source electrode is also coupled to the low voltage line. A second parasitic diode is formed between the second drain electrode and the second bulk electrode of the NMOS. The capacitor is coupled between the first drain electrode and the second drain electrode. The first detection node is coupled between the first drain electrode and the capacitor. When a transient voltage occurs on the high voltage line, the PMOS is in an off-state, and in the meantime the capacitor discharges through the first parasitic diode to the high voltage line, such that a first voltage level of the first detection node is lowered. On the other hand, the second detection node is coupled between the second drain electrode and the capacitor. When a transient voltage occurs on the low voltage line, the NMOS is in an off-state, and in the meantime the capacitor is charged by the low voltage line through the second parasitic diode, such that a second voltage level of the second detection node is elevated.

The judge module is coupled to the first detection node and the second detection node of each detection circuit respectively. The judge module judges the first voltage level of each first detection node and the second voltage level of each second detection node. Then, the judge module generates a judgment. The electronic system selectively performs a protective action according to the judgment.

The advantage and spirit of the invention may be understood by the following recitations together with the appended drawings.

DETAILED DESCRIPTION OF THE INVENTION

Figure 2:
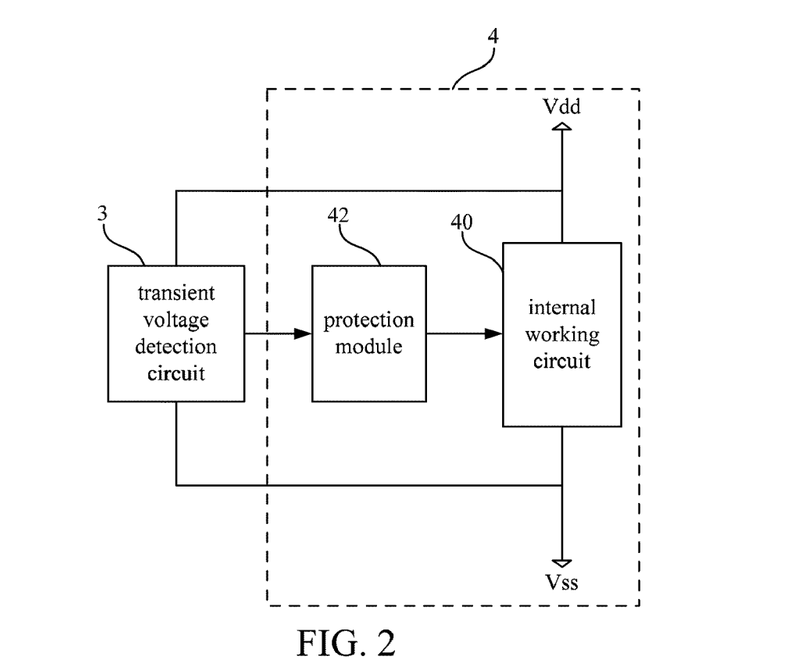
FIG. 2 is a schematic diagram illustrating a transient voltage detection circuit implemented with an electronic system according to a first embodiment of the invention.

Please refer to FIG. 2. FIG. 2 is a schematic diagram illustrating a transient voltage detection circuit 3 implemented with an electronic system 4 according to a first embodiment of the invention.

As shown in FIG. 2, the electronic system 4 in the embodiment includes a high voltage line Vdd, a low voltage line Vss, an internal working circuit 40 and a protection module 42. The transient voltage detection circuit 3 is coupled between the high voltage line Vdd and the low voltage line Vss. In this embodiment, the low voltage line takes Vss for example, but the invention is not limited to this. The low voltage line can be a relative low leveled reference voltage throughout the system. In some other applications, the low voltage line can be a system ground.

The transient voltage detection circuit 3 may detect a transient voltage between the voltage lines and generates a judgment. According to the judgment generated by the transient voltage detection circuit 3, the protection module 42 of the electronic system 4 can selectively perform a protective action to the internal working circuit 40. In practical applications, the protective action can be a system-reboot instruction or a system-shutdown instruction. The detail internal components and functions of the transient voltage detection circuit 3 in the invention are disclosed in the following paragraphs.

Figure 3:
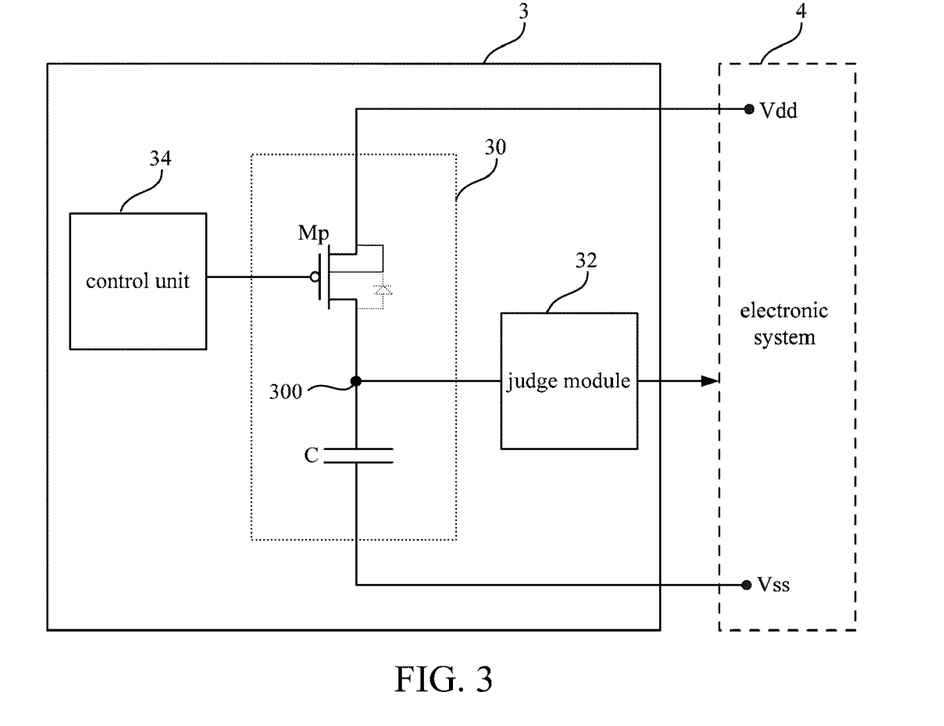
FIG. 3 is a schematic diagram illustrating the transient voltage detection circuit in FIG. 2 according to the first embodiment of the invention.

Please refer to FIG. 3. FIG. 3 is a schematic diagram illustrating the transient voltage detection circuit 3 in FIG. 2 according to the first embodiment of the invention. In this embodiment, the transient voltage detection circuit 3 includes a detection circuit 30, a judge module 32 and a control unit 34.

As shown in FIG. 3, the detection circuit 30 includes a PMOS Mp, a capacitor C and a detection node 300. The judge module 32 is coupled to the detection node 300. The PMOS Mp includes a gate electrode, a source electrode, a drain electrode and a bulk electrode. The source electrode is coupled with the bulk electrode, and the source electrode is also coupled to the high voltage line Vdd. A parasitic diode is formed between the drain electrode and the bulk electrode of the PMOS Mp. The capacitor C is coupled between the low voltage line Vss and the drain electrode. The detection node 300 is coupled between the drain electrode and the capacitor C. The control unit 34 is coupled to the gate of the PMOS Mp.

When the transient voltage detection circuit 3 is set up at first for detection, the control unit 34 may control the gate electrode of the PMOS Mp to switch on the PMOS Mp. Then, the high voltage line Vdd may pass through the PMOS Mp and charge the capacitor C. In this way, the voltage level of the detection node 300 is set up at an initial level. In this embodiment, the initial level of the detection node 300 is substantially equal to default working voltage of the high voltage line Vdd. Afterward, the PMOS is switched off, and the capacitor is used to keep the voltage level of the detection node 300 at the initial level.

Figure 4A:
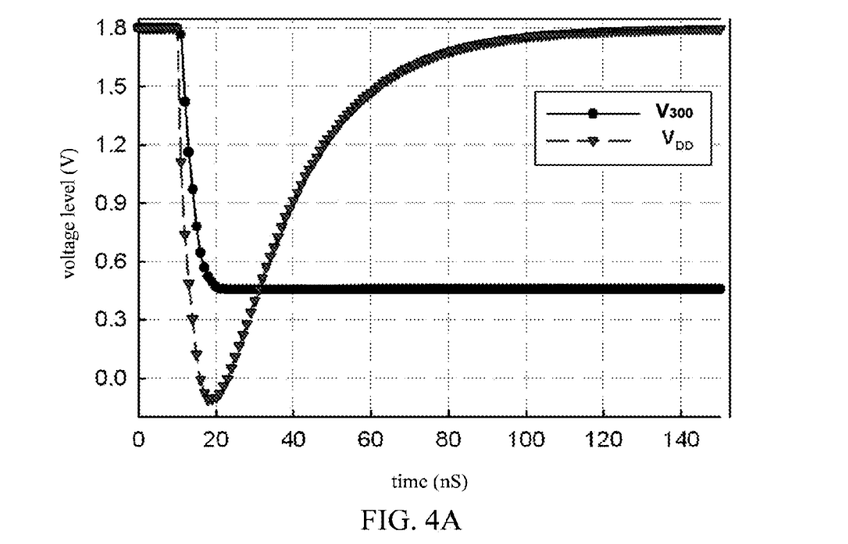
FIG. 4A is a timing diagram illustrating the voltage level of the transient voltage detection circuit in FIG. 3 when the transient voltage occurs on the high voltage line.

Afterward, when some system-level noise issues arise, a transient voltage may occur on the high voltage line Vdd. The transient voltage on the high voltage line Vdd can be transient undershoot on the high voltage line. When there is a transient undershoot occurring on the high voltage line Vdd, the level of the high voltage line Vdd may plunge abruptly, and then recover to normal level gradually. Please refer to FIG. 4A. FIG. 4A is a timing diagram illustrating the voltage level of the transient voltage detection circuit 3 in FIG. 3 when the transient voltage occurs on the high voltage line Vdd. The voltage level of the detection node 300 (shown as $V_{300}$ in FIG. 4A) begins at the initial level (1.8V). When the high voltage line Vdd is at low level during the transient undershoot, the voltage level $V_{300}$ of the detection node 300 exceeds the level of the high voltage line Vdd. The gap between these two may exceed a threshold voltage of the parasitic diode. Therefore, the capacitor C discharges through the parasitic diode to the high voltage line Vdd, such that the voltage level $V_{300}$ of the detection node 300 descends, until the gap between $V_{300}$ and Vdd is smaller than the threshold voltage of the parasitic diode. Take the embodiment in FIG. 4A for example, the voltage level $V_{300}$ of the detection node 300 descends from the initial level (1.8V) to a detectable level (0.45V). During this detection period, the PMOS Mp remains in an off-state. In other words, the main detection function in the invention does not involve the on/off switching of the PMOS Mp.

In the embodiment, a variance between the detectable level and the initial level is related to a size of the PMOS Mp, a circuit structure and a capacitance of the capacitor C in the detection circuit 30.

Figure 4B:
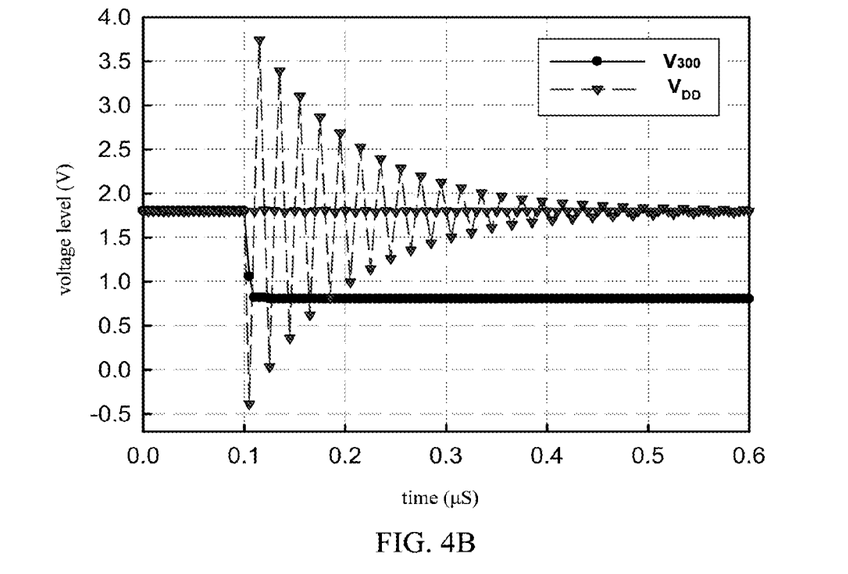
FIG. 4B is a timing diagram illustrating the transient voltage detection circuit in FIG. 3 when a transient voltage in another format occurs on the high voltage line.

The transient undershoot on the high voltage line Vdd shown in FIG. 4A is in an exponential format, but the invention is not limited to be applied on this format of noise. Please refer to FIG. 4B. FIG. 4B is a timing diagram illustrating the transient voltage detection circuit 3 in FIG. 3 when a transient voltage in another format occurs on the high voltage line Vdd. In the embodiment shown in FIG. 4B, the transient voltage detection circuit 3 can also be utilized to detect the transient undershoot on the high voltage line Vdd in a sinusoidal format.

In the embodiment, the judge module 32 coupled with the detection node 300 can be used to judge the voltage level of the detection node 300. When the transient voltage occurs on the high voltage line Vdd, the judge module 32 can detect the transient voltage and generate a judgment. Afterward, the electronic system 4 may perform a protective action according to the judgment.

In practical applications, the judge module 32 may include a comparator coupled with the detection node 300. The judge module 32 utilizes the comparator to compare the voltage level with a reference level, so as to generate the aforesaid judgment. The function and detail theory of the comparator is well known by a person in the art, so not to be mentioned here.

At last, after the protective action is completed on the electronic system 4, the control unit 34 of the transient voltage detection circuit 3 may control the gate electrode of the PMOS Mp to switch the PMOS Mp from the off-state to the on-state. When the PMOS Mp is in the on-state, the high voltage line Vdd may charge the capacitor C through the PMOS Mp and reset the voltage level of the detection node 300 from the detectable level back to the initial level. In this way, the transient voltage detection circuit 3 may utilize a singular PMOS circuit to serve as a channel for the detection signal and a switch for resetting function. The transient voltage detection circuit 3 can be implemented in simple structure and suitable for various microelectronic systems.

Figure 5:
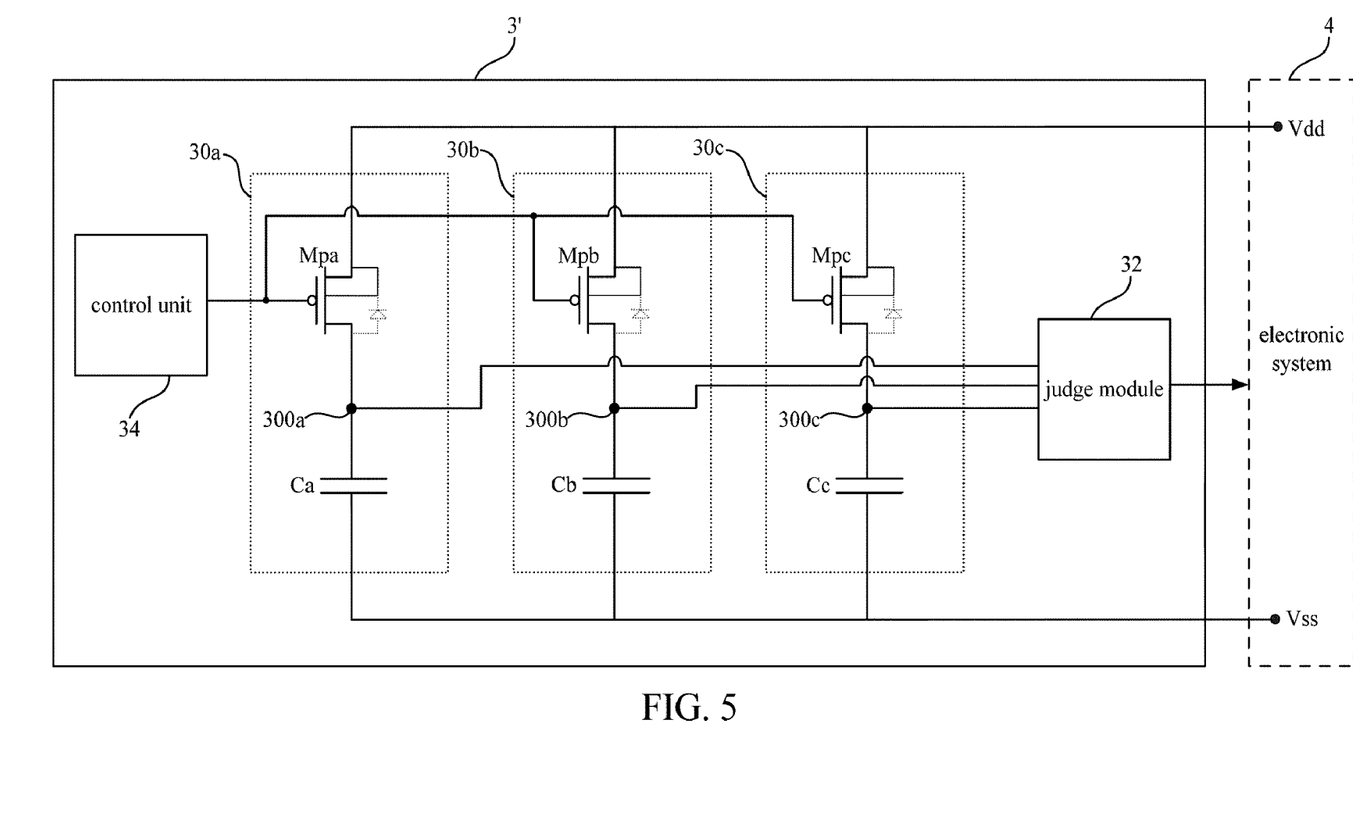
FIG. 5 is a schematic diagram illustrating a transient voltage detection circuit according to a second embodiment of the invention.
Figure 6:
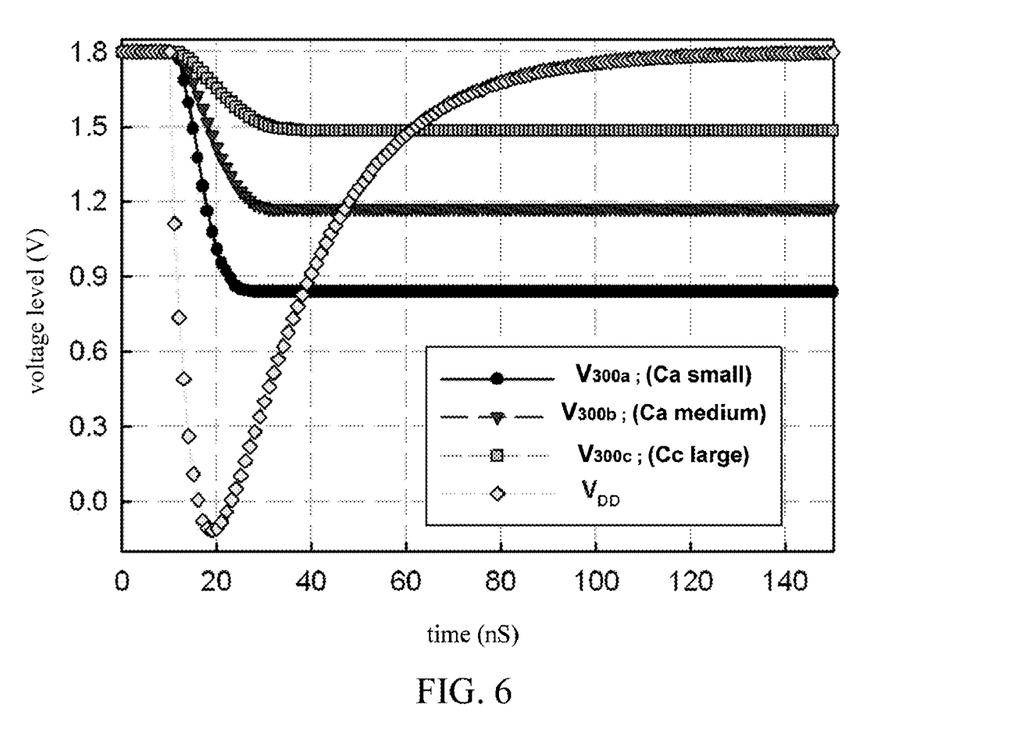
FIG. 6 is a timing diagram illustrating the voltage level of the transient voltage detection circuit in FIG. 5 when the transient voltage occurs on the high voltage line.

To be noticed that, the transient voltage detection circuit 3 in the first embodiment includes one singular set of the detection circuit 30, but the invention is not limited to this. Please refer to FIG. 5 and FIG. 6. FIG. 5 is a schematic diagram illustrating a transient voltage detection circuit 3' according to a second embodiment of the invention. FIG. 6 is a timing diagram illustrating the voltage level of the transient voltage detection circuit 3' in FIG. 5 when the transient voltage occurs on the high voltage line Vdd. The main difference between the first and the second embodiment is that, the transient voltage detection circuit 3' in the second embodiment includes three sets of the detection circuits (30a, 30b, 30c). Each detection circuit includes a PMOS, a capacitor and a detection node respectively. The judge module 32 is coupled with the detection nodes (300a, 300b, 300c) of the detection circuits respectively. The control unit 32 is coupled with the detection nodes (300a, 300b, 300c) of the detection circuits respectively, and the control unit 34 is coupled to the gate electrodes of the PMOSs (Mpa, Mpb, Mpc) respectively.

When a transient voltage occurs on the high voltage line Vdd as shown in FIG. 6, it induces the voltage levels on three detection nodes (300a, 300b, 300c) to vary. The voltage levels ($V_{300a}$, $V_{300b}$, and $V_{300c}$ in FIG. 6) of the detection nodes descend from an initial level to one detectable level of each detection node. At each detection node among the detection circuits, a variance between the detectable level and the initial level is related to a size of the PMOS, a circuit structure and a capacitance of the capacitor. Take the embodiment shown in FIG. 6 for example, three capacitors (Ca, Cb, Cc) in the transient voltage detection circuit 3' have different capacitance ranked as Ca<Cb<Cc. In this way, three detection circuits (30a, 30b, 30c) have different sensitivity coefficients. Accordingly, the judge module 32 of the transient voltage detection circuit 3' may not only detect the occurred transient voltage, but also differentiate the variance degree of the transient voltage in further detail according to the reactions on the detection nodes (300a, 300b, 300c).

In the embodiment, three detection circuits adopt capacitors with different capacitance, but the invention is not limited to this. The detection circuits may also achieve various sensitivities by adopting transistors with different sizes or inserting additional passive components into the detection circuits. In practical applications, the total amount of the detection circuit sets is not limited to three sets, but depends on practical specifications.

Figure 7:
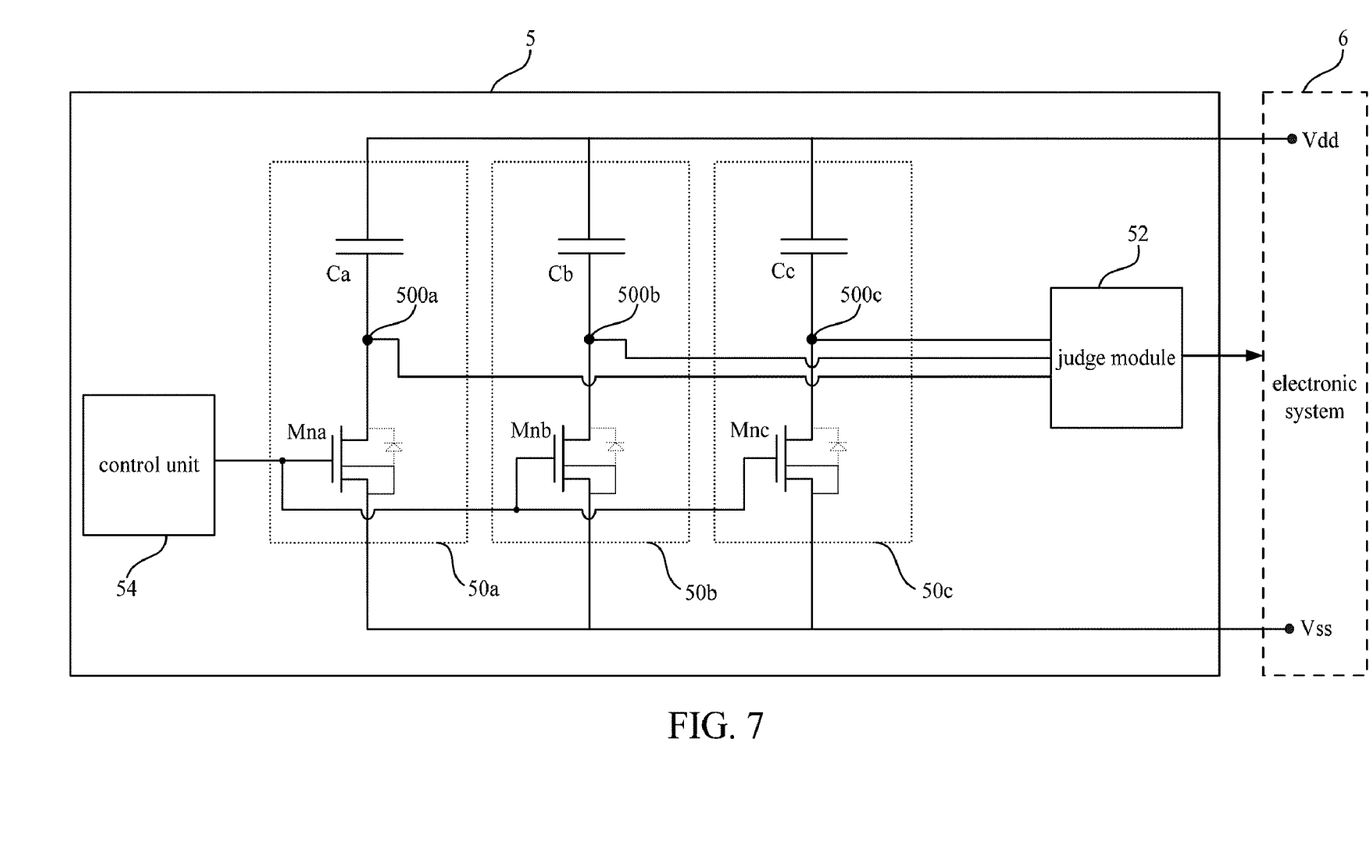
FIG. 7 is a schematic diagram illustrating a transient voltage detection circuit according to a third embodiment of the invention.
Figure 8:
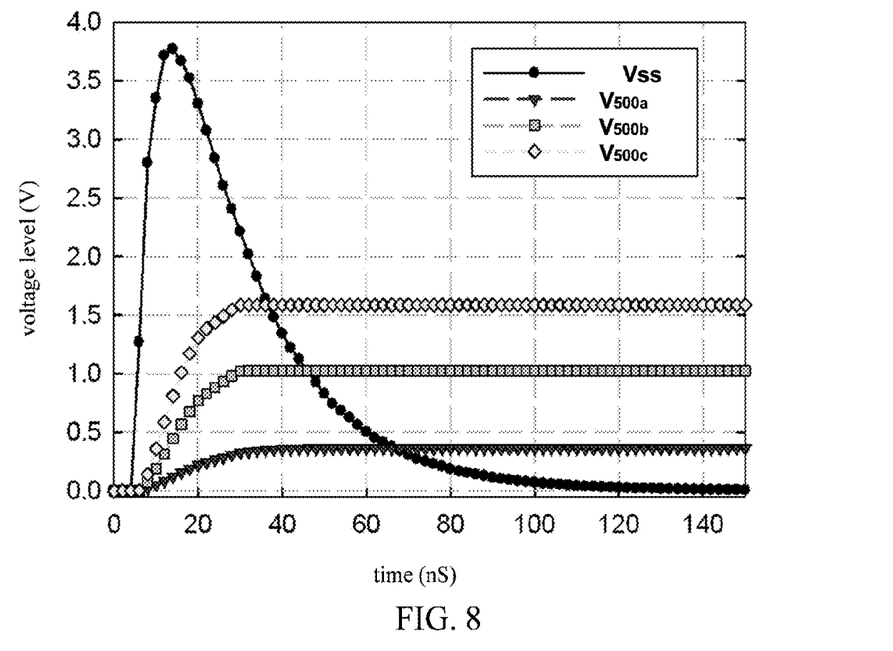
FIG. 8 is a timing diagram illustrating the voltage level of the transient voltage detection circuit in FIG. 7 when the transient voltage occurs on the low voltage line.

Please refer to FIG. 7 and FIG. 8. FIG. 7 is a schematic diagram illustrating a transient voltage detection circuit 5 according to a third embodiment of the invention. FIG. 8 is a timing diagram illustrating the voltage level of the transient voltage detection circuit 5 in FIG. 7 when the transient voltage occurs on the low voltage line Vss.

As shown in FIG. 7, the transient voltage detection circuit 5 is suitable for an electronic system 6. The electronic system 6 includes a high voltage line Vdd and a low voltage line Vss.

In the embodiment, the transient voltage detection circuit 5 includes three sets of detection circuits (50a, 50b, 50c), a judge module 52 and a control unit 54. Each detection circuit includes a NMOS, a capacitor and a detection node.

These three detection circuits (50a, 50b, 50c) have similar structures. In the following descriptions, it simply takes the detection circuit 50a from three detection circuits for demonstration. The detection circuit 50a includes the NMOS Mna, the capacitor Ca and the detection node 500a. The NMOS Mna includes a source electrode, a drain electrode and a bulk electrode. The source electrode is coupled with the bulk electrode, and the source electrode is also coupled to the low voltage line Vss. A parasitic diode is formed between the drain electrode and the bulk electrode of the NMOS Mna. The capacitor Ca is coupled between the high voltage line Vdd and the drain electrode. The detection node 500a is coupled between the drain electrode and the capacitor Ca.

Firstly, the control unit 54 may turn on the NMOS Mna to set up the detection node 500a at an initial level. In the embodiment, the initial level is substantially equal to the level of the low voltage line Vss (which is 0V in the embodiment).

Afterward, when some system-level noise issues arise, a transient voltage may occur on the low voltage line Vss. The transient voltage on the low voltage line Vss can be transient overshoot on the low voltage line. When there is a transient overshoot occurring on the low voltage line Vss, the level of the low voltage line Vss may pulse abruptly over the level of the detection node 500a. When the gap between levels of the low voltage line Vss and the detection node 500a exceeds a threshold voltage of the parasitic diode, the capacitor Ca is charged by the low voltage line Vss through the parasitic diode, such that the voltage level ($V_{500a}$ in FIG. 8) of the detection node 500a is elevated from the initial level (0V) to a detectable level (approx. 0.4V). During this detection period, the NMOS Mna is in an off-state.

In the embodiment, at each detection node among the detection circuits (50a, 50b, 50c), a variance between the detectable level and the initial level on each detection node (500a, 500b, 500c) is related to a size of the NMOS, a circuit structure and a capacitance of the capacitor respectively.

The judge module 52 may include a comparator coupled to the detection node of each detection circuit respectively. The judge module 52 utilizes the comparator to compare the voltage level of each detection node with a reference level, so as to generate a judgment. The electronic system 6 selectively performs a protective action according to the judgment. The details of the judge method, protective actions and other corresponding components in this system are similar to the aforesaid embodiments, so not to be repeated here.

Figure 9:
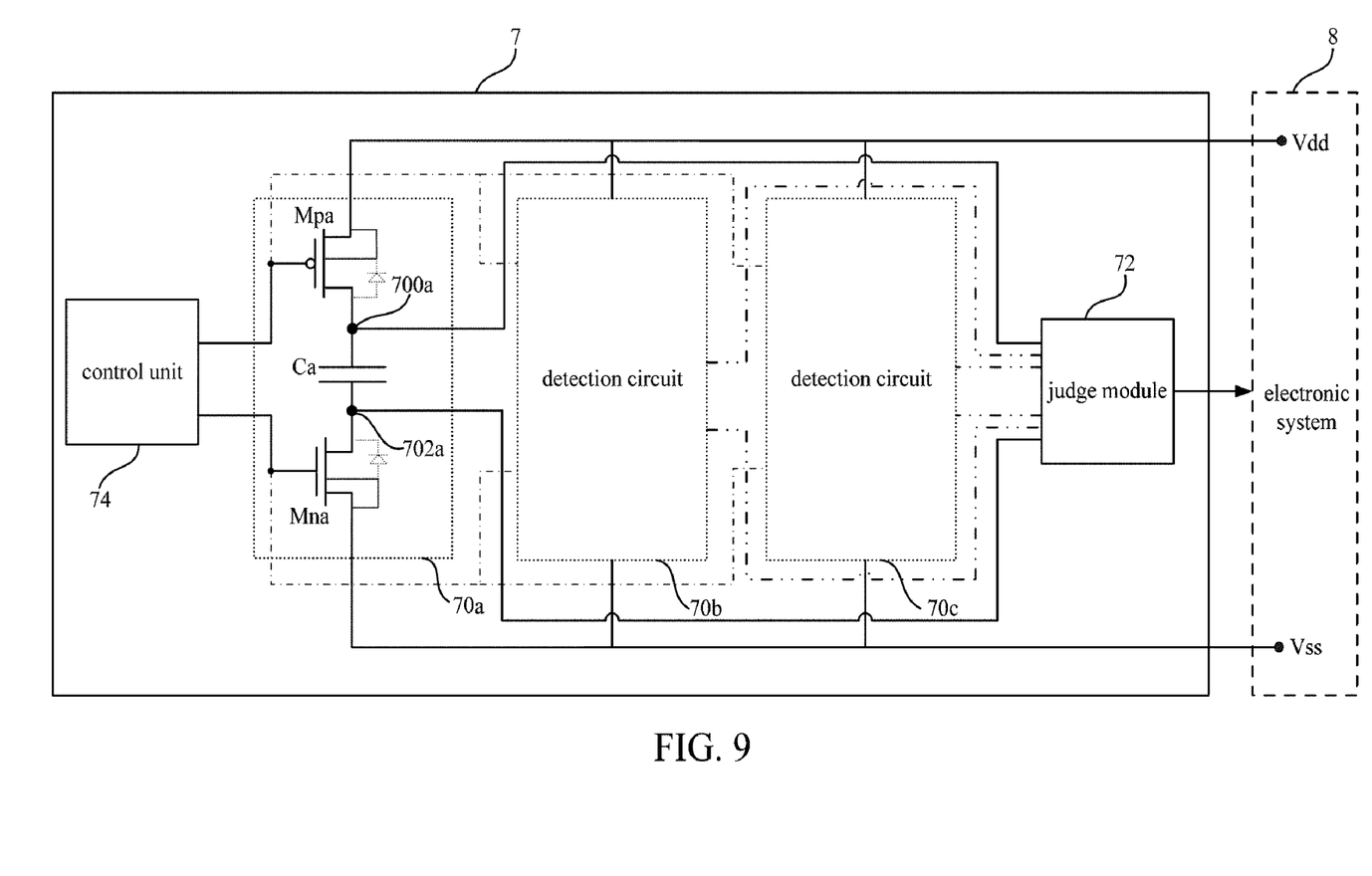
FIG. 9 is a schematic diagram illustrating a transient voltage detection circuit according to a fourth embodiment of the invention.

Please refer to FIG. 9. FIG. 9 is a schematic diagram illustrating a transient voltage detection circuit 7 according to a fourth embodiment of the invention. The transient voltage detection circuit 7 includes three detection circuits (70a, 70b, 70c).

The main difference from the aforesaid embodiment is that, each detection circuit of the transient voltage detection circuit 7 includes a PMOS and a NMOS at the same time for corresponding to different transient voltage (e.g. transient undershoot and transient overshoot). Take the detection circuit 70a for example; the detection circuit 70a includes the PMOS Mpa, the NMOS Mna, a capacitor Ca, a first detection node 700a and a second detection node 702a. The PMOS Mpa includes a first source electrode, a first drain electrode and a first bulk electrode. The first source electrode is coupled with the first bulk electrode, and the first source electrode is also coupled to the high voltage line Vdd. A first parasitic diode is formed between the first drain electrode and the first bulk electrode of the PMOS Mpa. The NMOS Mna includes a second source electrode, a second drain electrode and a second bulk electrode. The second source electrode is coupled with the bulk electrode, and the second source electrode is also coupled to the low voltage line Vss. A second parasitic diode is formed between the second drain electrode and the second bulk electrode of the NMOS Mna. The capacitor Ca is coupled between the first drain electrode and the second drain electrode. The first detection node 700a is coupled between the first drain electrode and the capacitor Ca. When a transient voltage (e.g. transient undershoot) occurs on the high voltage line Vdd, the PMOS Mpa is in an off-state, and in the meantime the capacitor Ca discharges through the first parasitic diode to the high voltage line Vdd, such that a first voltage level of the first detection node 700a is lowered. On the other hand, the second detection node 702a is coupled between the second drain electrode and the capacitor Ca. When a transient voltage (transient overshoot) occurs on the low voltage line Vss, the NMOS is in an off-state, and in the meantime the capacitor Ca is charged by the low voltage line Vss through the second parasitic diode, such that a second voltage level of the second detection node 702a is elevated.

The judge module 72 is coupled to the first detection node and the second detection node of each detection circuit (70a, 70b, 70c) respectively. The judge module 72 judges the first voltage level of each first detection node and the second voltage level of each second detection node. Then, the judge module 72 generates a judgment. The electronic system 8 selectively performs a protective action according to the judgment. Besides, the control unit 74 may control the gate electrodes of the PMOSs and the NMOSs in the detection circuits (70a, 70b, 70c), so as to set up or reset the level of the detection nodes.

The transient voltage detection circuit of the invention may detect different kinds of transient voltage in an electronic system timely and effectively, and further to perform protective actions on the electronic system. Besides, the transient voltage detection circuit of the invention can be implemented in simple structure and suitable for various microelectronic systems.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A transient voltage detection circuit, suitable for an electronic system, the electronic system comprising a high voltage line and a low voltage line, the transient voltage detection circuit comprising:
   at least one detection circuit, wherein each detection circuit comprises:
   a P-type metal-oxide-semiconductor field-effect transistor (PMOS), the PMOS comprising a source electrode, a drain electrode and a bulk electrode, the source electrode being coupled with the bulk electrode, the source electrode also being coupled to the high voltage line, a parasitic diode being formed between the drain electrode and the bulk electrode of the PMOS;
   a capacitor coupled between the low voltage line and the drain electrode; and
   a detection node coupled between the drain electrode and the capacitor, when a transient voltage occurs on the high voltage line, the PMOS being in an off-state, the capacitor discharging through the parasitic diode to the high voltage line, such that a voltage level of the detection node is lowered; and
   a judge module coupled to the detection node of each detection circuit respectively, the judge module judging the voltage level of each detection node and generating a judgment, the electronic system selectively performing a protective action according to the judgment.

2. The transient voltage detection circuit of claim 1, wherein the judge module comprises a comparator, the comparator is coupled to the detection node of each detection circuit respectively, and the comparator compares the voltage level of each detection node with a reference level, so as to generate the judgment.

3. The transient voltage detection circuit of claim 1, wherein when the transient voltage occurs on the high voltage line, the capacitor discharges through the parasitic diode to the high voltage line, such that the voltage level of each detection node is lowered from an initial level to a detectable level respectively.

4. The transient voltage detection circuit of claim 3, wherein at each detection node among the detection circuits, a variance between the detectable level and the initial level is related to a size of the PMOS, a circuit structure and a capacitance of the capacitor.

5. The transient voltage detection circuit of claim 3, further comprising a control unit, the control unit being coupled to a gate electrode of the PMOS of each detection circuit and used for switching the PMOS from the off-state to an on-state, when the PMOS in each detection circuit is in the on-state, the high voltage line charging the capacitor through the PMOS and resetting the voltage level of the detection node from the detectable level to the initial level.

6. The transient voltage detection circuit of claim 1, wherein the transient voltage is a transient undershoot on the high voltage line, and the protective action is a system-reboot instruction or a system-shutdown instruction.

7. A transient voltage detection circuit, suitable for an electronic system, the electronic system comprising a high voltage line and a low voltage line, the transient voltage detection circuit comprising:
at least one detection circuit, wherein each detection circuit comprises:
an N-type metal-oxide-semiconductor field-effect transistor (NMOS), the NMOS comprising a source electrode, a drain electrode and a bulk electrode, the source electrode being coupled with the bulk electrode, the source electrode also being coupled to the low voltage line, a parasitic diode being formed between the drain electrode and the bulk electrode of the NMOS;
a capacitor coupled between the high voltage line and the drain electrode; and
a detection node coupled between the drain electrode and the capacitor, when a transient voltage occurs on the low voltage line, the NMOS being in an off-state, the capacitor being charged by the low voltage line through the parasitic diode, such that a voltage level of the detection node is elevated; and
a judge module coupled to the detection node of each detection circuit respectively, the judge module judging the voltage level of each detection node and generating a judgment, the electronic system selectively performing a protective action according to the judgment.

8. The transient voltage detection circuit of claim 7, wherein the judge module comprises a comparator, the comparator is coupled to the detection node of each detection circuit respectively, and the comparator compares the voltage level of each detection node with a reference level, so as to generate the judgment.

9. The transient voltage detection circuit of claim 7, wherein when the transient voltage occurs on the low voltage line, the capacitor is charged by the low voltage line through the parasitic diode, such that the voltage level of each detection node is elevated from an initial level to a detectable level respectively.

10. The transient voltage detection circuit of claim 9, wherein at each detection node among the detection circuits, a variance between the detectable level and the initial level is related to a size of the NMOS, a circuit structure and a capacitance of the capacitor.

11. The transient voltage detection circuit of claim 9, further comprising a control unit, the control unit being coupled to a gate electrode of the NMOS of each detection circuit and used for switching the NMOS from the off-state to an on-state, when the NMOS in each detection circuit is in the on-state, the capacitor discharging through the NMOS to the low voltage line and resetting the voltage level of the detection node from the detectable level to the initial level.

12. The transient voltage detection circuit of claim 7, wherein the transient voltage is a transient overshoot on the low voltage line, and the protective action is a system-reboot instruction or a system-shutdown instruction.

13. A transient voltage detection circuit, suitable for an electronic system, the electronic system comprising a high voltage line and a low voltage line, the transient voltage detection circuit comprising:
at least one detection circuit, wherein each detection circuit comprises:
a P-type metal-oxide-semiconductor field-effect transistor (PMOS), the PMOS comprising a first source electrode, a first drain electrode and a first bulk electrode, the first source electrode being coupled with the first bulk electrode, the first source electrode also being coupled to the high voltage line, a first parasitic diode being formed between the first drain electrode and the first bulk electrode of the PMOS;
an N-type metal-oxide-semiconductor field-effect transistor (NMOS), the NMOS comprising a second source electrode, a second drain electrode and a second bulk electrode, the second source electrode being coupled with the bulk electrode, the second source electrode also being coupled to the low voltage line, a second parasitic diode being formed between the second drain electrode and the second bulk electrode of the NMOS;
a capacitor coupled between the first drain electrode and the second drain electrode;
a first detection node coupled between the first drain electrode and the capacitor, when a transient voltage occurs on the high voltage line, the PMOS being in an off-state, the capacitor discharging through the first parasitic diode to the high voltage line, such that a first voltage level of the first detection node is lowered; and
a second detection node coupled between the second drain electrode and the capacitor, when a transient voltage occurs on the low voltage line, the NMOS being in an off-state, the capacitor being charged by the low voltage line through the second parasitic diode, such that a second voltage level of the second detection node is elevated; and
a judge module coupled to the first detection node and the second detection node of each detection circuit respectively, the judge module judging the first voltage level of each first detection node and the second voltage level of each second detection node, accordingly the judge module generating a judgment, the electronic system selectively performing a protective action according to the judgment.

14. The transient voltage detection circuit of claim 13, wherein the judge module comprises a comparator, the comparator is coupled to the first detection node and the second detection node of each detection circuit respectively, the comparator compares the first voltage level of each first detection node with a reference level, and in the meantime the comparator compares the second voltage level of each second detection node with a reference level, so as to generate the judgment.

15. The transient voltage detection circuit of claim 13, wherein when the transient voltage occurs on the high voltage line, the capacitor discharges through the first parasitic diode to the high voltage line, such that the first voltage level of each first detection node is lowered from an initial level to a detectable level respectively.

16. The transient voltage detection circuit of claim 15, wherein at each first detection node among the detection circuits, a variance between the detectable level and the initial level is related to a size of the PMOS, a circuit structure and a capacitance of the capacitor.

17. The transient voltage detection circuit of claim 13, wherein when the transient voltage occurs on the low voltage line, the capacitor is charged by the low voltage line through the second parasitic diode, such that the second voltage level of each second detection node is elevated from an initial level to a detectable level respectively.

18. The transient voltage detection circuit of claim 17, wherein at each second detection node among the detection circuits, a variance between the detectable level and the initial level is related to a size of the NMOS, a circuit structure and a capacitance of the capacitor.

19. The transient voltage detection circuit of claim 13, further comprising a control unit, the control unit being coupled to the PMOS and the NMOS of each detection circuit and used for switching the PMOS and the NMOS from the off-state to an on-state, so as to reset the first voltage level of each first detection node and to rest the second voltage level of each second detection node.

20. The transient voltage detection circuit of claim 13, wherein the transient voltage is a transient undershoot on the high voltage line or a transient overshoot on the low voltage line, and the protective action is a system-reboot instruction or a system-shutdown instruction.

* * * * *